(12) United States Patent
Patel

(10) Patent No.: US 11,553,703 B2
(45) Date of Patent: Jan. 17, 2023

(54) ATTRACTION SYSTEMS FOR PESTS AND USE THEREOF

(71) Applicant: Biocare Gesellschaft Fuer Biologische Schutzmittel Mbh, Einbeck (DE)

(72) Inventor: Anant Patel, Bielefeld (DE)

(73) Assignee: BIOCARE GESELLSCHAFT FUER BIOLOGISCHE SCHUTZMITTEL MBH, Einbeck (DE)

( * ) Notice: Subject to any disclaimer, the term of this patent is extended or adjusted under 35 U.S.C. 154(b) by 589 days.

(21) Appl. No.: 14/428,057

(22) PCT Filed: Sep. 13, 2013

(86) PCT No.: PCT/EP2013/068984
§ 371 (c)(1),
(2) Date: Mar. 13, 2015

(87) PCT Pub. No.: WO2014/041112
PCT Pub. Date: Mar. 20, 2014

(65) Prior Publication Data
US 2017/0079258 A1    Mar. 23, 2017

(30) Foreign Application Priority Data
Sep. 14, 2012 (DE) .................... 10 2012 108 621.4

(51) Int. Cl.
| | | |
|---|---|---|
| *H04N 19/85* | (2014.01) | |
| *A01M 1/02* | (2006.01) | |
| *A01N 59/04* | (2006.01) | |
| *A01M 1/20* | (2006.01) | |
| *A01N 63/10* | (2020.01) | |
| *A01N 63/12* | (2020.01) | |
| *A01N 63/20* | (2020.01) | |
| *A01M 17/00* | (2006.01) | |
| *H04N 19/593* | (2014.01) | |
| *H04N 19/11* | (2014.01) | |

(52) U.S. Cl.
CPC .......... *A01M 1/023* (2013.01); *A01M 1/2011* (2013.01); *A01M 17/002* (2013.01); *A01M 17/008* (2013.01); *A01N 59/04* (2013.01); *A01N 63/10* (2020.01); *A01N 63/12* (2020.01); *A01N 63/20* (2020.01)

(58) Field of Classification Search
CPC .... A01N 59/04; A01N 2300/00; A01N 25/10; A01N 25/22; A01N 53/00
USPC ......................................................... 424/405
See application file for complete search history.

(56) References Cited

U.S. PATENT DOCUMENTS

| | | | |
|---|---|---|---|
| 4,880,624 A | | 11/1989 | Metcalf et al. |
| 6,177,072 B1 | * | 1/2001 | Tuzun .................. A01N 25/006 |
| | | | 424/405 |
| 6,978,572 B1 | | 12/2005 | Bernklau et al. |
| 2002/0146394 A1 | * | 10/2002 | Stamets ................. A01N 63/04 |
| | | | 424/93.5 |
| 2007/0104751 A1 | * | 5/2007 | Levar ..................... A01N 25/00 |
| | | | 424/405 |

FOREIGN PATENT DOCUMENTS

| | | | |
|---|---|---|---|
| DE | 3718934 A1 | | 12/1987 |
| WO | 0132013 A1 | | 5/2001 |
| WO | WO 0132013 A1 | * | 5/2001 ............ A01M 1/023 |
| WO | 03028453 A1 | | 4/2003 |

OTHER PUBLICATIONS

Bernklau et al., "Disruption of Host Location of Western Corn Rootworm Larvae (Coleoptera: Chrysomelidae) with Carbon Dioxide" Ecology and Behavior, 2004, p. 330-339.

* cited by examiner

*Primary Examiner* — Johann R Richter
*Assistant Examiner* — Courtney A Brown
(74) *Attorney, Agent, or Firm* — WCF IP

(57) ABSTRACT

The present application is directed to a system and device for attraction of pests. This system comprises $CO_2$-releasing microorganisms, and also nutrients specific to these microorganisms, and this system, or the device, comprises one or more biodegradable biopolymers and allows $CO_2$, and optionally other attractants, to be released over a period of more than 20 days. Furthermore, the present application provides for the use of such a system or such a device for the attraction of pests, more particularly of maize or potato pests, such as larvae of the Western corn rootworm or wire worm. The present application is also directed, lastly, to methods for attracting pests, more particularly pests of maize or potatoes, such as the larvae of the Western corn rootworm, or for wire worms, with the systems or devices of the invention being positioned in the immediate vicinity of the plants, but preferably not directly on the plants.

20 Claims, 2 Drawing Sheets

ATTRACTION SYSTEMS FOR PESTS AND USE THEREOF

The present application is directed to a system and device for attracting pests. This system comprises $CO_2$-releasing microorganisms and also nutrients specific for these microorganisms, this system or device comprising one or more biodegradable biopolymers and allowing release of $CO_2$ and optionally other attractants over a period of more than 20 days.

The present application additionally provides for the use of such a system or device for attracting pests, more particularly corn or potato pests, such as, for example, larvae of the Western corn rootworm or wireworm. Lastly, the present application is also directed to methods of attracting pests, such as soil-dwelling pests, more particularly pests of corn or potatoes, such as the larvae of the Western corn rootworm, the black vine weevil, or for wireworms, the systems or devices of the invention being positioned in the immediate vicinity of the plants, but preferably not directly at the plants.

PRIOR ART

Carbon dioxide ($CO_2$) is a known attractant for various soil-dwelling organisms. A large number of pest insects make use of $CO_2$ and its concentration in order to locate the hosts. One important example of this is the Western corn rootworm (*Diabrotica virgifera virgifera*), whose larvae use $CO_2$ in order to locate the roots of living corn plants, in order then to use them as food, when they move in the direction of the ascending $CO_2$ gradient.

The destruction of the roots and the associated physiological stress on the plants by the feeding behavior of the larvae result in high losses in the case of these crop plants. Consequently, on a worldwide basis, the Western corn rootworm is an important pest, economically as well. There are studies from the early 2000s ascribing a loss of up to 1 billion U.S. dollars in the USA to damage by the larvae of the Western corn rootworm.

In addition to various customary chemical or biological pesticides, attempts have been made to disrupt the location of the hosts by this pest—such location taking place, as stated, through an ascending $CO_2$ gradient. For example, Bernklau E. A. et al., in Journal of Economic Entomology, 97(2), 330-339, 2004, describe methods and devices for attracting pests. There is a description of grains of baker's yeast and corresponding nutrients therefor, with organic substrate as well, which then serve as a $CO_2$ source in order to keep the larvae of the Western corn rootworm away from the corn plant roots.

WO 01/32013 discloses methods and devices for attracting soil-dwelling insects. WO 03/028453 describes biodegradable solid preparations of a crop protection agent with delayed release of active ingredient. But a problem affecting the formulations described in the prior art is that the $CO_2$ gradient and hence the activity of these systems are possible only for a short period; in the experiments, a period of 2 weeks at most was found for these formulations. In actual fact, however, effective control of the larvae of the Western corn rootworm, and of other pests as well, such as wireworms in the case of potatoes, for example, requires a gradient over a longer period in order effectively to control the pests.

The aim of the present application is the provision of such systems and the use thereof in pest control, and also corresponding methods. In particular, the systems and devices of the invention permit control of soil pests, more particularly corn and potato pests, such as the larvae of the Western corn rootworm or the wireworms, the larvae of beetles from the click beetle family. These larvae are known pests in forestry and agriculture, and in horticulture as well, and cause considerable damage in both the softwood and hardwood sectors and also, in particular, in the potato sector.

DESCRIPTION OF THE INVENTION

Provided in accordance with the invention is a system or device for attracting pests. This system or device comprises $CO_2$-releasing microorganisms and nutrients specific for these microorganisms. A feature of the system or device is that it comprises one or more biodegradable polymers that surrounds, preferably completely, the other constituents of the system, in the form of a capsule, for example, and permits release of $CO_2$ and optionally other attractants, released by the microorganisms or present additionally in the system, over a period of more than 20 days.

The release of the $CO_2$ is preferably over a period of more than 25 days, such as over 28 days or longer, as for example over 35 days or more.

The expressions "system" and "device" are presently used synonymously unless otherwise stated.

The expression "over a period of more than 20 days" means presently that the $CO_2$-releasing microorganisms actively release $CO_2$ in the system over a period of more than 20 days. This means more particularly that the $CO_2$ concentration in the immediate surroundings of the system is above the $CO_2$ concentration in a region more remote from the system, thus forming a $CO_2$ gradient in the direction of the system. This is so especially in the soil.

In accordance with the invention, the system or device comprises particles including capsules, pellets, or granules, such as capsules, with at least the capsule shell or capsule matrix being formed by one or more biopolymers. The capsules in question may comprise those comprising biopolymers completely, in the form of pellets, for example. In one embodiment, these pellets or capsules may be fully surrounded by the biopolymer. Alternatively they may comprise granules, in which case the one or more biopolymers in the case of these granules surround—likewise preferably completely surround—the other constituents, or serve as a crosslinking and/or stabilizing matrix. Also possible are embodiments of the system of the invention wherein the biopolymers are interspersed through the particles, such as capsules, pellets, or granules, composed of the further constituents, and therefore provide the necessary stability to the system.

In particular, the $CO_2$-releasing microorganisms present in the system are fungi or bacteria. The microorganisms are preferably yeasts, including commercially available yeasts, such as baker's yeast, but also residual yeast from production of beer, wine, and bioethanol. One or more different microorganisms may be present, either likewise releasing $CO_2$ and/or having auxiliary functions.

In one embodiment an at least second microorganism, auxiliary organism, may be one having insecticidal or nematicidal activity. Suitable microorganisms are known to the skilled person. This at least second micro-organism preferably comprises entomopathogenic micro-organisms, such as entomopathogenic fungi or entomo-pathogenic nematodes. "Entomopathogenic" means presently that the organism possesses the capacity to infest, kill, immobilize, or otherwise negate the noxious effects of insects.

Of these, one preferred example of a second microorganism of this kind is the fungus *Beauveria bassiana*. This fungus is known as a soil-dwelling fungus which acts parasitically on various arthropod species and is a known biological insecticide. A likewise-known alternative to it is a fungus from the genus of the *Metarhizia*, such as *M. anisopliae*.

The at least second microorganism, auxiliary organism, may also preferably be one which is able to convert nutrients present in the system in such a way that they can be more effectively metabolized by the micro-organisms responsible for $CO_2$ production. For example, the fungus *Beauveria bassiana* or *M. anisopliae* allows breakdown of starch, which is present as a specific nutrient for the microorganism in the system. *Beauveria bassiana* or *M. anisopliae* may therefore fulfill two functions in this system—on the one hand, the insecticidal or nematicidal activity as an entomopathogenic fungus, and on the other hand the conversion of nutrients in order to make them more effectively metabolizable for the microorganisms responsible for $CO_2$ release, on the basis of its amylase activity, for example.

The nutrients specific for these microorganisms are, for example, nutrients selected from corn flour, corn protein and/or other corn constituents, starch or constituents containing starch, squash flour, potato flour, or other polysaccharide-containing nutrients suitable as nutrients, for example, for yeasts.

The skilled person knows of suitable nutrients for the microorganisms present in the system.

As already mentioned above, in a further embodiment, the system is one which additionally comprises a pesticide, more particularly an insecticide or nematicide. These pesticides may in one embodiment be those from the group of the chemical insecticides, such as tefluthrin, those of plant extracts, such as neem oil or azadirachtin, quassia extract or the like, or else biological plant protection agents, such as the aforementioned entomopathogenic fungi or entomopathogenic nematodes.

It has been found that systems, more particularly capsules such as pellets, which comprise yeast, corn flour or other starch sources, and *Beauveria bassiana* or *M. anisopliae*, the desired properties of the development of an appropriate $CO_2$ concentration which allows for the attraction of pests, such as the Western corn rootworm or wireworms over a period of more than 20 days.

The system may additionally have further constituents, such as fillers, drying assistants, glucose, sucrose, further attractants such as cucurbitacin or other known chemical attractants for the pests, and also cellulose, lignin and/or swelling aids. The skilled person knows of suitable further constituents, which do not interact with microorganisms present in the system in such a way that these microorganisms present in the system are killed or otherwise restricted in their function.

As stated, a feature of the systems of the invention is that they comprise one or more biodegradable biopolymers. These biopolymers are in a form, for example, in which they substantially, preferably fully, surround the other constituents of the system. In the embodiment of capsules, accordingly, the biodegradable polymers form the capsule shell. In this case they are of a form such that exchange of nutrients, and more particularly emergence of $CO_2$, is possible.

In one alternative embodiment of a system of the invention, the biopolymers constitute the matrix. In that case they are of a form such that the biopolymers surround the other constituents preferably substantially, such as fully.

The biodegradable biopolymers are, in particular, those composed of alginate, carrageenan, cellulose, hemicellulose, starch, chitin, chitosan, pectinate, guar gum, acacia gum, poly-D,L-lactic acid, gelatin, poly-amino acids, lignin, and derivatives, and also mixtures thereof. The skilled person knows of biopolymers that are appropriately suitable. Use may be made, for example, of alginate or of an alginate/gelatin mixture.

The biopolymers, which in particular are biodegradable, are those which are largely degraded in the soil preferably after the vegetation period or before the next vegetation period.

The present application is directed, furthermore, to the use of a system or device of the invention for attracting pests, more particularly corn pests or potato pests or, generally, pests of the plant constituents, such as the tuber-bearing stolons of the potato, and the tubers themselves.

With particular preference the system or device of the invention is used in order to control corn pests or potato pests, here more particularly the Western corn rootworm as a known corn pest, or the wireworm as a known potato pest. It is also used against the black vine weevil (in strawberries, for example). The system in this case is preferably one which also has insecticides or nematicides, such as *Beauveria bassiana*, for example, in order to kill the pests after attracting them. This approach is known generally in the art as "attract and kill" (alternatively: "lure and kill"). The systems and devices of the invention may alternatively have active plant ingredients or active chemical ingredients for killing the pests.

The invention, furthermore, provides corresponding methods for attracting and optionally controlling pests. This method is in particular for the control of pests of corn or potatoes, and in that context especially of those which attack the root region or the region located in the earth. The method is suitable more particularly for attracting and controlling larvae of the Western corn rootworm, of the black vine weevil, or wireworms. The method of the invention is one which utilizes the systems and devices of the invention in order to attract the pests. The systems and devices, in the form of capsules, for example, are positioned in the immediate vicinity of the plants, such as the corn or the potato, in the soil. It is preferred for this positioning to take place not directly at the plant, but rather at a predetermined distance in the vicinity of the plant. The skilled person can determine the appropriate distance easily. The achievement thereby is that the pests are lured away from the plant. It is possible, for example, for the systems of the invention, in the form of capsules or granules, for example, to be introduced between the sown seeds or seedlings. The systems in this case may take place simultaneously with the introduction of the corresponding plant seeds or plant seedlings. Alternatively or additionally the systems may be introduced with appropriate measures in a subsequent period.

The method of the invention is notable in particular in that it builds up an ascending $CO_2$ gradient from the plant in the direction of the system in the soil. As a result it is possible to attract the pests in question via the gradient in the direction of the system and there, where appropriate, to kill them or otherwise immobilize them. The method is therefore suitable for attracting and killing the pests over a long period. In accordance with the invention, this period within which the pests are attracted is at least 20 days, preferably at least 25 days, such as at least 30 days.

Particularly suitable embodiments are those in the form of capsules or pellets comprising a biopolymer or a biopolymer mixture, at least one $CO_2$-releasing micro-organism, such as yeast, nutrients, such as starch-containing nutrients, auxiliary microorganisms, such as *B. bassiana* and/or *M. anisopliae*, and optionally further kill components such as neem or quassin.

One formulation of the system comprises biopolymer, yeast, corn flour or other flour, and *B. bassiana*. Another formulation of the system comprises biopolymer, yeast, corn flour or other flour, and *M. anisopliae*.

Further formulations for the system of the invention are those specified above and further comprising neem or quassin.

The systems and devices of the invention may include further attractants which attract the pests as well as or in addition to $CO_2$. More particularly these attractants are those which attract the pests in the direction of the system over a relatively short distance, allowing them optionally to be killed there.

In the text below, the system of the invention and the use in accordance with the invention are described in more detail, without being limited thereto.

EXAMPLES

Example 1

Formulation of the System of the Invention

*S. cerevisiae* is suspended in a predetermined amount, either as a cultivated strain or as commercially available baker's yeast mix, optionally with the other constituents, such as corn flour and *Beauveria bassiana*, in 2% sodium alginate, introduced dropwise by means of a conventional encapsulating device into a 2% strength $CaCl_2$ solution, and subjected to postcrosslinking for 20 minutes. The capsules were produced with a diameter of 2.7 mm on average.

Example 2

Determining the $CO_2$ Gradient and the Duration of Release

The capsules were placed in the earth in a pot in an amount of either 1 g or 10 g. $CO_2$ release rates and the $CO_2$ concentration in the soil were measured using customary $CO_2$ meters. The $CO_2$ release rates were determined at the stated times. There were alginate capsules with no addition (active ingredient-free alginate capsules), alginate capsules with a fraction of 16.7% baker's yeast mix, and alginate capsules with 16.7% baker's yeast mix, starch and, as an auxiliary microorganism exhibiting amylase activity, amylase source, in the present instance *Beauveria bassiana*.

Figure 1:
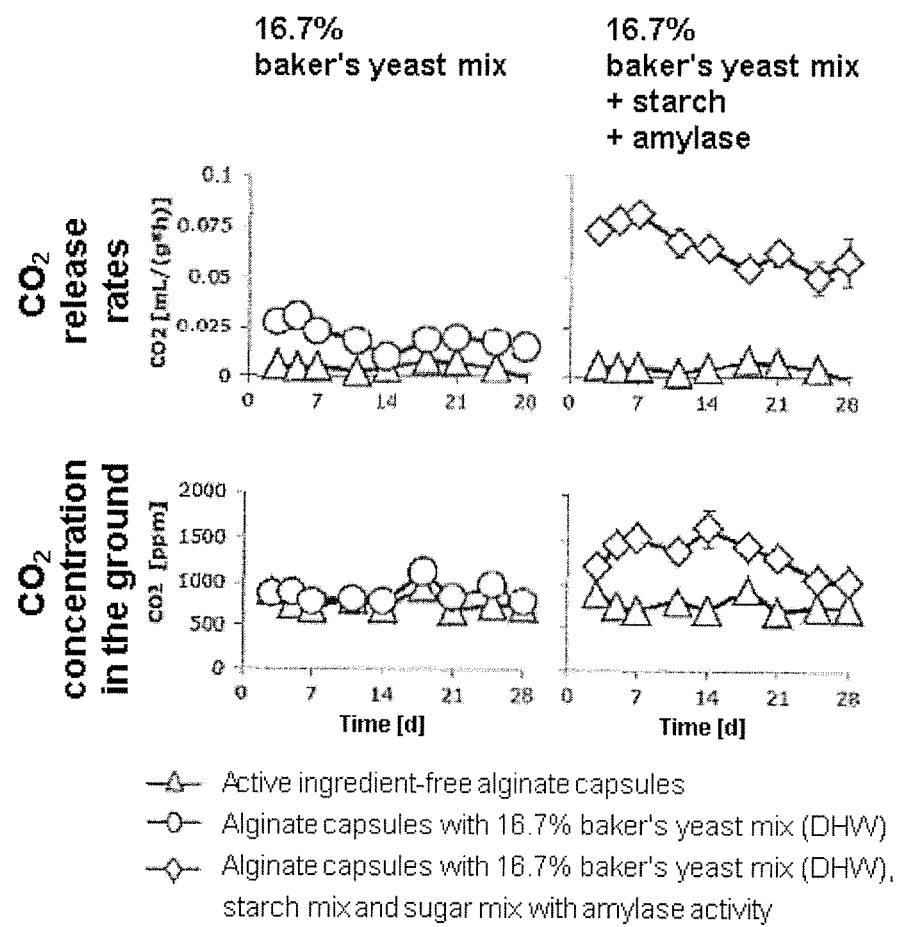
FIG. 1 is a set of graphs which show the $CO_2$ release rate and the CO2 concentration in the soli with various capsules.

FIG. 1 shows the $CO_2$ release rate and the $CO_2$ concentration in the soil with the various capsules. Clearly evident are the increased release and the increased concentration even still after more than 20 days. In FIG. 1, commercial baker's yeast was used, admixed with a starch and sugar mix with amylase activity.

Figure 2:
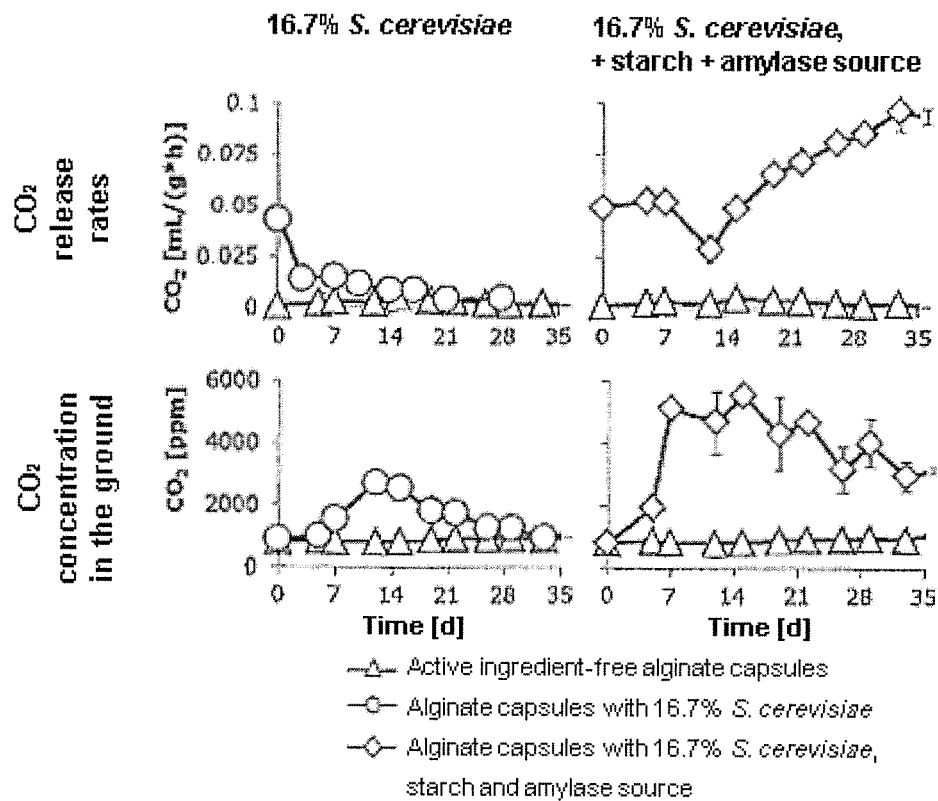
FIG. 2 is a set of graphs which show the measurements that are the same as in FIG. 1 carried out with pure S. cerevisiae and corn flour.

In FIG. 2, the same measurements were carried out with pure *S. cerevisiae* and corn flour, and also *Beauveria bassiana*. The capsules used accordingly are shown. Particularly high release rates and $CO_2$ concentrations in the soil are observed for the combination of yeast with starch as nutrient and also *B. bassiana* as amylase source.

Hence it is possible in accordance with the invention to provide systems and devices, in the form of capsules, for example, which release $CO_2$ in the soil and so build up a gradient in order to attract pests and optionally to immobilize and/or kill them. This release takes place over a period of more than 20 days, such as more than 30 days, for example. This is a sufficient period to keep the pests away from the plants.

Example 3

Use of *M. anisopliae*

As observed in example 1, capsules of the invention are produced. Here, *B. bassiana* was replaced by *M. anisopliae*. The $CO_2$ gradient and the duration of $CO_2$ release were determined as in example 2.

It was found that the $CO_2$ gradient could be maintained over a period of more than 35 days. It was also found that the larvae of the corn rootworm were present to an increased extent around the capsules and in a smaller number around the plants.

Figure 3:
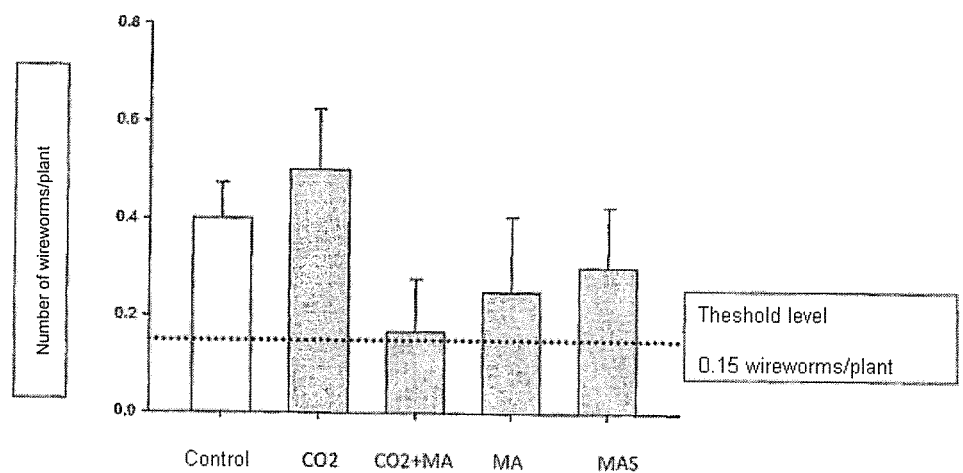
FIG. 3 is a bar graph which shows reduction in wireworm density.

It was apparent, moreover, that a reduction in wireworm density was achievable in the case of investigations with wireworms. This is clear from FIG. 3. $CO_2$ denotes capsules with yeast, $CO_2$+MA denotes capsules with yeast and *M. anisopliae*, MA is *M. anisopliae* alone, and MAS denotes spores of the MA strain. ART2825 is the *M. anisopliae* strain used here.

Example 4

Formulation of the System of the Invention with Plant-Based Pesticides

As described in example 1, capsules are produced, with either Neem Azal or a quassin extract (Trifolio-M, Germany) being added instead of *B. bassiana*, in amounts of 1-10% w/w in the case of Neem Azal and 1-5% w/w for the quassin extract.

It was found that the added pesticides show no adverse effect on the yeast, and the yeast remained viable over a relatively long period. The build-up of the $CO_2$ gradient is comparable with the capsules described before.

The invention claimed is:

1. A system or device for attracting pests, comprising:
   yeast which release $CO_2$;
   nutrients for the yeast which release $CO_2$;
   amylase or one or more auxiliary microorganisms with amylase activity which are different from the yeast which release $CO_2$ to convert the nutrients to a form that is metabolizable by the yeast; and
   one or more biodegradable biopolymers which encapsulate the yeast, the nutrients, and the amylase or the one or more auxiliary microorganisms with amylase activity, and wherein the one or more biodegradable biopolymers release $CO_2$ produced by the yeast over a period of more than 20 days.

2. The system or device of claim 1 wherein the nutrients are selected from corn flour, corn protein, other corn constituents, starch, squash flour, and potato flour.

3. The system or device of claim 1, further comprising one or more pesticides.

4. The system or device of claim 3 wherein said one or more pesticides are selected from the group consisting of an insecticide and a nematicide.

5. The system or device of claim 4 wherein the insecticide or nematicide are selected from the group of chemical insecticides, plant extracts, and biological plant protection agents.

6. The system or device of claim 5, wherein the chemical insecticide is tefluthrin, and/or the plant extract is selected from the group consisting of neem oil, azadirachtin extract, and quassia extract, and/or the biological plant protection agent is selected from entomopathogenic fungi and entomopathogenic nematodes.

7. The system of claim 1, further comprising one or more of constituent fillers, drying assistants, glucose, sucrose, additional attractants, cellulose, lignin, and swelling aids.

8. The system or device of claim 1 wherein the one or more biodegradable biopolymers are selected from alginate, carrageenan, cellulose, hemicellulose, starch, chitin, chitosan, pectinate, guar gum, acacia gum, poly-D,L-lactic acid, gelatin, poly-amino acids, lignin, and derivatives, and mixtures thereof.

9. The system or device of claim 1 wherein the system or device is configured in the form of capsules or granules.

10. The system or device of claim 1, wherein the auxiliary organisms are fungi.

11. A method for attracting pests of corn or potatoes, comprising the provision of a system or device of claim 1 in the immediate vicinity of corn or potato plants.

12. The method of claim 11, wherein an ascending $CO_2$ gradient from the plant in the direction of the system is built up in the soil.

13. The method of claim 11 wherein the pests are selected from the group consisting of larvae of the Western corn rootworm, wireworms, and the black vine weevil.

14. The method of claim 13 wherein the system or device permits immobilization or killing of the larvae of the Western corn rootworm or of the wireworm or of the black vine weevil.

15. The system or device of claim 1 wherein the yeast is baker's yeast.

16. The system or device of claim 7 wherein said additional attractants is cucurbitacin.

17. The system or device of claim 10 wherein the fungi are selected from the group consisting of *B. bassiana* and *M. anisopliae*.

18. A system or device for attracting pests, comprising:
   yeast which release $CO_2$;
   nutrients;
   fungi which convert the nutrients to a form that is metabolizable by the yeast, thereby supporting a supply of nutrients to the yeast; and
   one or more biodegradable biopolymers which encapsulate the yeast, the nutrients, and the fungi, wherein the one or more biodegradable biopolymers release $CO_2$ produced by the yeast over a period of more than 20 days.

19. The system or device of claim 18 wherein the one or more biodegradable biopolymers are selected from alginate, carrageenan, cellulose, hemicellulose, starch, chitin, chitosan, pectinate, guar gum, acacia gum, poly-D,L-lactic acid, gelatin, poly-amino acids, lignin, and derivatives, and mixtures thereof.

20. A system or device for attracting pests, comprising:
   yeast which release $CO_2$;
   nutrients for the yeast which release $CO_2$;
   amylase to convert the nutrients to a form that is metabolizable by the yeast; and
   one or more biodegradable biopolymers which encapsulate the yeast, the nutrients, and the amylase, and wherein the one or more biodegradable biopolymers release $CO_2$ produced by the yeast over a period of more than 20 days.

\* \* \* \* \*